J. T. Van Kirk,
Ice Pick,
№ 29,220. Patented July 17, 1860.
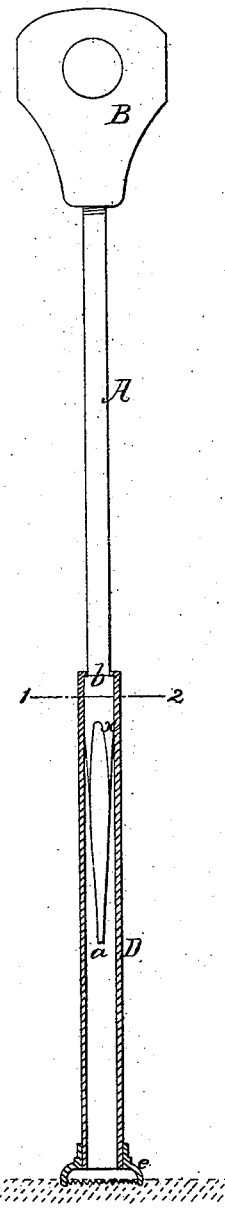
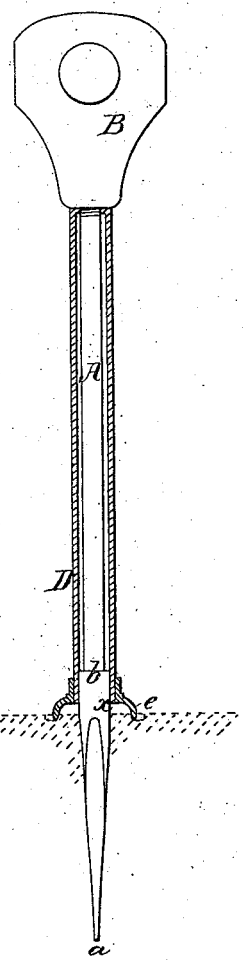
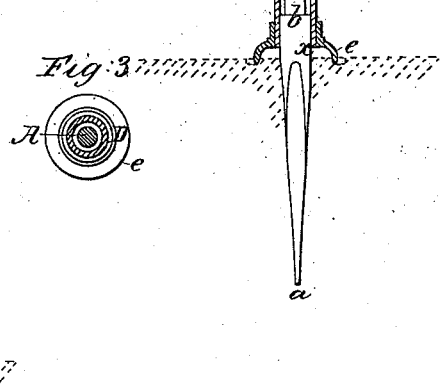
Witnesses;
Henry Howson
Charles Howson
Inventor;
J T Van Kirk

UNITED STATES PATENT OFFICE.

J. T. VAN KIRK, OF PHILADELPHIA, PENNSYLVANIA, ASSIGNOR TO C. A. VAN KIRK & CO., OF SAME PLACE.

IMPROVED ICE-PICK.

Specification forming part of Letters Patent No. 29,220, dated July 17, 1860.

*To all whom it may concern:*

Be it known that I, J. T. VAN KIRK, of Philadelphia, in the State of Pennsylvania, have invented a new and useful Improvement in Ice-Picks; and I do hereby declare the following to be a full, clear, and exact description of the same, reference being had to the accompanying drawings, and to the letters of reference marked thereon.

My invention consists of a stem pointed at one end and having a weighted handle on the opposite end, in combination with a tube or other equivalent guide having its lower end serrated, sharpened, or otherwise constructed so as to rest and retain a hold on the block of ice during the descent of the pointed stem, the whole forming an instrument for breaking blocks of ice with facility and precision.

In order to enable others to make and use my invention, I will now proceed to describe its construction and operation.

On reference to the accompanying drawings, which form a part of this specification, Figure 1 is a vertical section of my improved ice-pick with the stem elevated; Fig. 2, the same with the stem depressed; and Fig. 3, a transverse section on the line 1 2, Fig. 2.

A is the stem, to which the weighted head or handle B is permanently secured. The lower portion of the stem is enlarged, so as to form a collar $b$, this enlarged portion being parallel for a short distance from the said collar downward to a point $x$, from whence it tapers gradually downward to the point $a$. This parallel part of the enlarged portion of the stem is arranged to fit snugly, but so as move freely within the tube D, which is contracted at the top so as to be adapted to the main body of the stem and so as to prevent the latter from being withdrawn from the tube, the lower end of which is furnished with a hollow enlargement $e$, of the form of an inverted cup, with a serrated or sharpened edge.

In using my improved ice-pick the operator takes the weighted handle B in his right hand, and with the other hand guides the tube D so as to direct its lower end to that point of the block of ice on which he desires the point $a$ of the stem to act. He then allows the stem to fall of its own weight, or, with the weighted handle still in his right hand, brings the stem down with a sudden movement. In either case the point $a$ takes the desired effect on the ice, shattering or breaking the latter at the desired part.

It is not absolutely necessary that the operator should guide the enlargement $e$ to its proper position on the ice by laying hold of the tube D, the apparatus being readily operated by one hand only, in which the weighted handle is grasped, while the other hand is at liberty.

It will be seen that the part of the ice to be struck having been determined on, the tube D will not readily move from that part, owing to the serrated or sharpened edge of its enlargement $e$. The tube consequently serves as a certain guide to direct the point $a$ of the stem to the part where a fracture is desired. The enlargement $e$ possesses the further advantage of preventing the small particles of ice from flying about when the point of the stem comes in contact with the block—an evil which is the source of much annoyance in operating with ordinary ice-picks.

I claim as my invention and desire to secure by Letters Patent—

The pointed stem A, with its weighted handle B, in combination with the tube D, or other equivalent guide, serrated or otherwise so constructed at its lower end as to retain a hold on the ice during the descent of the said weighted stem, as herein set forth, for the purpose specified.

In testimony whereof I have signed my name to this specification in the presence of two subscribing witnesses.

J. T. VAN KIRK.

Witnesses:
  HENRY HOWSON,
  CHARLES D. FREEMAN.